(12) United States Patent  (10) Patent No.: US 11,651,395 B2
Nishiyama et al.  (45) Date of Patent: May 16, 2023

(54) ON-BOARD SIGNAGE SYSTEM

(71) Applicant: Toyota Jidosha Kabushiki Kaisha, Toyota (JP)

(72) Inventors: Masahiro Nishiyama, Toyota (JP); Kenji Tsukagishi, Toyota (JP); Takahisa Kaneko, Toyota (JP); Erina Kigoshi, Tokyo-to (JP); Aiko Miyamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/208,187

(22) Filed: Mar. 22, 2021

(65) Prior Publication Data

US 2021/0304254 A1 Sep. 30, 2021

(30) Foreign Application Priority Data

Mar. 25, 2020 (JP) .............................. JP2020-054724

(51) Int. Cl.
*G06Q 30/00* (2023.01)
*G06Q 30/0251* (2023.01)
*H04W 4/21* (2018.01)
*H04W 4/23* (2018.01)
*G01C 21/34* (2006.01)
(Continued)

(52) U.S. Cl.
CPC ..... *G06Q 30/0266* (2013.01); *G01C 21/3484* (2013.01); *H04W 4/023* (2013.01);
(Continued)

(58) Field of Classification Search
CPC ...... G06Q 30/0266; H04W 4/23; H04W 4/24; H04W 4/44; H04W 4/024; H04W 4/023; G01C 21/3484
See application file for complete search history.

(56) References Cited

U.S. PATENT DOCUMENTS

2011/0320300 A1\* 12/2011 Broms .................. G06Q 30/02
705/26.1
2014/0040016 A1\* 2/2014 Amla ................. G06Q 30/0267
705/14.63
(Continued)

FOREIGN PATENT DOCUMENTS

JP  2010-237411 A  10/2010
JP  2013-148949 A  8/2013
(Continued)

OTHER PUBLICATIONS

Wu, M., Ma, B., Liu, Z., Xiu, L., & Zhang, L. (2017). BLE-horn: A smartphone-based bluetooth low energy vehicle-to-pedestrian safety system, 2017 9th International Conference on Wireless Communications and Signal Processing, 2017 (Year: 2017).\*

*Primary Examiner* — Matthew L Hamilton
(74) *Attorney, Agent, or Firm* — Dinsmore & Shohl LLP

(57) ABSTRACT

An on-board signage system includes one or more vehicles, a display device configured to display an assigned image on a display area of each of the vehicles, and a signage controller, in which the signage controller is configured to function as an image database for storing a plurality of candidate images, a terminal database for storing identification information and owner information of a registered terminal, a terminal location acquiring unit configured to acquire location information of the registered terminal, and a selector that selects at least one of a travel route for the vehicle and an image to be assigned to the vehicle, based on the location information and the owner information of the registered terminal, and transmits the selected travel route or image to the vehicle.

9 Claims, 11 Drawing Sheets

(51) Int. Cl.
*H04W 4/44* (2018.01)
*H04W 4/024* (2018.01)
*H04W 4/02* (2018.01)

(52) U.S. Cl.
CPC ............ *H04W 4/024* (2018.02); *H04W 4/21* (2018.02); *H04W 4/23* (2018.02); *H04W 4/44* (2018.02)

(56) References Cited

U.S. PATENT DOCUMENTS

| | | | |
|---|---|---|---|
| 2014/0279012 A1* | 9/2014 | Scofield | G06Q 30/0261 705/14.58 |
| 2015/0220991 A1* | 8/2015 | Butts | G06Q 30/0265 705/14.62 |
| 2016/0328730 A1* | 11/2016 | Salamon | G06Q 30/0207 |
| 2018/0254001 A1* | 9/2018 | Koren | G02B 27/0149 |
| 2019/0138988 A1* | 5/2019 | High | G05D 1/0278 |
| 2019/0197927 A1 | 6/2019 | Matsuoka et al. | |
| 2019/0220010 A1* | 7/2019 | Leonard | B60W 50/14 |
| 2019/0222885 A1* | 7/2019 | Cho | G06Q 30/0265 |
| 2019/0355019 A1 | 11/2019 | Takanashi et al. | |
| 2020/0402106 A1* | 12/2020 | Manicka | G09F 21/04 |
| 2021/0365989 A1* | 11/2021 | Garg | H04W 4/40 |

FOREIGN PATENT DOCUMENTS

| | | |
|---|---|---|
| JP | 2017138243 A | 8/2017 |
| JP | 2019-117215 A | 7/2019 |
| WO | 2018105217 A1 | 6/2018 |

\* cited by examiner

| TERMINAL ID | LOCATION | GENDER | AGE | ... | PROFESSIONAL OCCUPATION | PLACE OF RESIDENCE |
|---|---|---|---|---|---|---|
| 0001 | LONGITUDE AND LATITUDE | F | 25 | ... | ... | ... |
| 0002 | LONGITUDE AND LATITUDE | M | 48 | ... | ... | ... |
| 0003 | LONGITUDE AND LATITUDE | F | 55 | ... | ... | ... |

FIG. 7

| ID | TARGET | TIME | REGION | ... | PRIORITY | ACTUALLY DISPLAYED RECORD |
|---|---|---|---|---|---|---|
| 0001 | F20-40 | | NATIONWIDE | ... | ... | ... |
| 0002 | M20-60 | 17-24 | NATIONWIDE | ... | ... | ... |
| 0003 | F15- | 11-22 | *** TOWN | ... | ... | ... |

FIG. 8

ON-BOARD SIGNAGE SYSTEM

CROSS REFERENCE TO RELATED APPLICATION

This application claims priority to Japanese Patent Application No. 2020-054724 filed on Mar. 25, 2020, which is incorporated herein by reference in its entirety including the specification, claims, drawings, and abstract.

TECHNICAL FIELD

The present disclosure discloses an on-board signage system mounted on a vehicle and configured to display an image on a display viewable from outside the vehicle.

BACKGROUND

There have been conventionally known techniques for mounting a display on an outer surface of a vehicle and displaying images on the display in order to utilize the vehicle as movable digital signage. For example, JP 2019-117215 A discloses a technique for mounting a display on an exterior surface of a vehicle and displaying an advertising picture on the display.

However, in JP 2019-117215 A, a manner of selecting an image to be displayed is unknown.

In recent years, information technology associated with vehicles has drastically advanced, and connected vehicles capable of communicating not only with a specific management center but also with various "things" have been suggested. Such connected vehicles are able to perform, for example, vehicle-to-vehicle (V2V) communication which is communication between vehicles, vehicle-to-infrastructure (V2I) communication which is communication between a vehicle and infrastructure equipment disposed on a road, vehicle-to-pedestrian (V2P) communication which is communication between a vehicle and a terminal device carried by a pedestrian, and the like. Conventionally, effective utilization of information obtained through such connected technology has not been studied sufficiently.

Under these circumstances, the present disclosure discloses an on-board signage system capable of using information acquired through connected technology to thereby enhance effectiveness of posting advertisement and attracting attention.

SUMMARY

In an aspect of the present disclosure, an on-board signage system includes at least one vehicle, a display device mounted on the at least one vehicle and configured to display an image assigned to the at least one vehicle on one or more display areas viewable from outside of the at least one vehicle, and a signage controller which is configured to function as an image database for storing a plurality of candidate images assignable to the at least one vehicle, a terminal database for storing identification information of a registered terminal which is previously registered in the on-board signage system and owner information of the registered terminal, a terminal location acquiring unit that acquires location information of the registered terminal, and a selector that selects, based on the location information of the registered terminal and the owner information of the registered terminal, at least one of a travel route of the at least one vehicle and an image to be assigned to the at least one vehicle, and transmits the selected travel route or image to the at least one vehicle.

When at least one of the travel route for the vehicle and the image to be assigned to the vehicle is selected based on both the location information and the owner information of the registered terminal, an advertising effect can be increased.

In this case, the selector may include a route selecting unit configured to estimate, based on the location information of the registered terminal and the owner information of the registered terminal, a region where there are a lot of people who match the image assigned to the vehicle, and to select the travel route for the vehicle based on the estimated region.

When configured as described above, because the vehicle can actively go to the region where there are a lot of people who are targeted for advertisement, the advertising effect can be further increased.

Further, the selector may include an image selecting unit configured to estimate, based on the owner information of the registered terminal which is or will be located in a vicinity of a present or future vehicle location, a trend of people located in the vicinity of the vehicle location, and to select an image to be assigned to the vehicle based on the estimated trend.

When configured as described above, it becomes possible to show the image that matches the people located in the vicinity of the vehicle, which can help further increase the advertising effect.

In this case, the vehicle may include a Vehicle to Pedestrian (V2P) communication unit configured to directly communicate with any registered terminal located within a fixed range of the vehicle, and the terminal location acquiring unit may recognize, as the vicinity of the vehicle, a location of a registered terminal which has directly communicated with the vehicle through the V2P communication unit.

When configured as described above, it becomes unnecessary for the registered terminal to transmit its location information at regular intervals, which can lead to a reduced volume of communication traffic in the registered terminal. In addition, the location information of the registered terminal may be considered to be relatively sensitive personal information. When a setting of transmitting such personal information at regular intervals is not employed, it can be ensured that the personal information of the owner of the registered terminal is well protected.

In an aspect of the present disclosure, the signage controller may be further configured to also function as a bonus offering unit which offers a bonus to at least one of the owner of the vehicle and the owner of the registered terminal when feedback relating to the image displayed on the vehicle is received from the owner of the registered terminal.

When the bonus is given to the owner of the vehicle, the vehicle is apt to behave in such a manner that the feedback can be easily obtained. On the other hand, when the bonus is given to the owner of the registered terminal, the owner of the registered terminal actively returns feedback. As a result, the advertising effect of the image can be further increased.

In this case, the vehicle may include a vehicle-to-pedestrian (V2P) communication unit configured to directly communicate with the registered terminal located within a predetermined range of the vehicle, and the feedback may include direct communication with the vehicle established by the registered terminal.

In the above-described configuration, when the bonus is offered to the owner of the vehicle, the owner of the vehicle is motivated to select a drive form in which communication with the registered terminal can be easily established (such as, for example, a form of driving at lower speeds and at a position close to a sidewalk). When the bonus is offered to the owner of the registered terminal, the owner of the registered terminal is motivated to actively approach the vehicle in order to view the image displayed on the vehicle. As a result, the advertising effect can be further increased.

In an aspect of the present disclosure, the vehicle may supply the registered terminal with access information used by the registered terminal for accessing detailed information about the image displayed on the vehicle, and the feedback may include an access to the detailed information performed by the registered terminal.

When, in the above-described configuration, the bonus is offered to the owner of the vehicle, the owner of the vehicle is motivated to select a drive form in which the vehicle can easily supply the registered terminal with the access information (such as, for example, the form of driving at lower speeds and at a position close to a sidewalk). On the other hand, when the bonus is offered to the owner of the registered terminal, the owner of the registered terminal is motivated to actively access the detailed information. This can contribute to a further increase in the advertising effect.

In an aspect, the feedback may include an action of entering a post content item regarding the vehicle or the image displayed on the vehicle into a social networking service (hereinafter referred to as "SNS") site.

When, in the above-described configuration, the bonus is offered to the owner of the vehicle, the owner of the vehicle is motivated to select a drive form which facilitates posting to the SNS site (such as, for example, the form of driving at lower speeds and at a position close to a sidewalk). On the other hand, when the bonus is offered to the owner of the registered terminal, the owner of the registered terminal is motivated to actively upload a post content item to the SNS site. Then, the post content item relating to the image is entered into the SNS site and spread therefrom, which can help further increase the advertising effect.

The on-board signage system disclosed herein can ensure that the advertising effect is increased.

BRIEF DESCRIPTION OF DRAWINGS

Embodiments of the present disclosure will be described based on the following figures, wherein:

FIG. 7 shows an example of data items stored in a terminal database;

FIG. 8 shows an example of data items stored in an image database;

DESCRIPTION OF EMBODIMENTS

Figure 1:
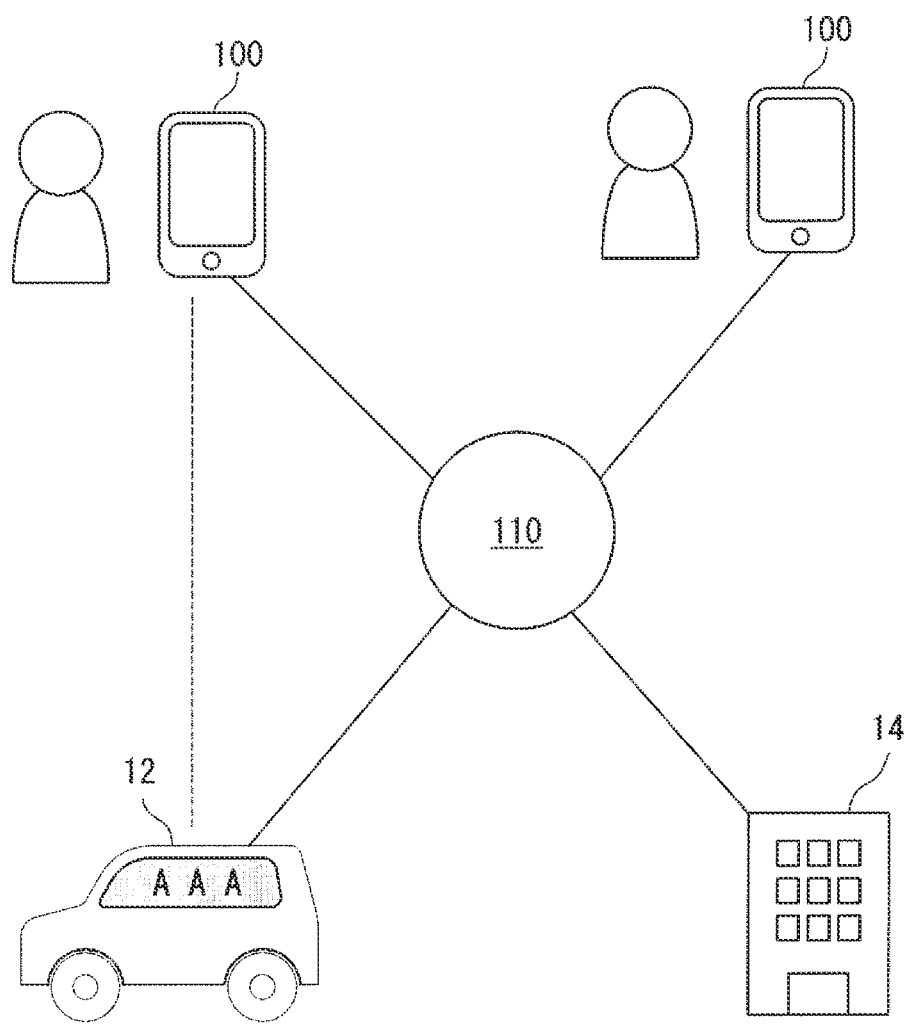
FIG. 1 is a diagram showing a configuration of an on-board signage system.
Figure 2:
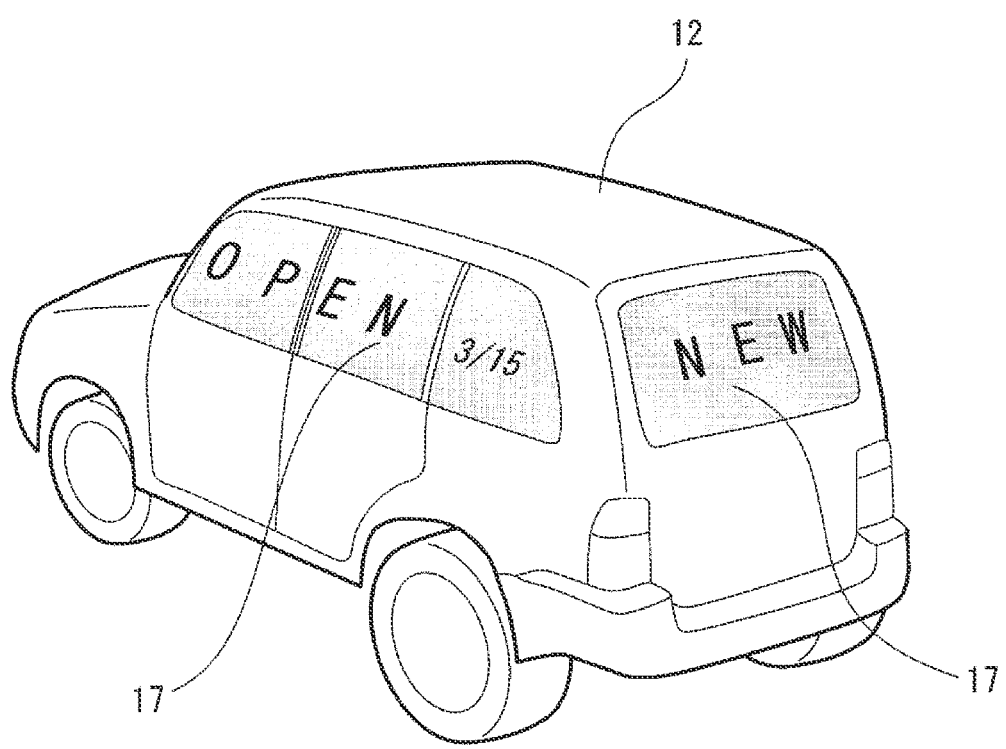
FIG. 2 is an external view of a vehicle used in the on-board signage system.

Hereinafter, a configuration of an on-board signage system 10 will be described with reference to the drawings. FIG. 1 is a diagram showing the configuration of the on-board signage system 10, and FIG. 2 is an external view of a vehicle 12 used in the on-board signage system.

The on-board signage system 10 is a system which causes the vehicle 12 to travel under a condition that various images are displayed on the vehicle 12 for advertising. Here, the term "advertising" means an activity of an organization or an individual for propagating information toward the general public, and includes, of course, publicizing activities of public relations for commercial purposes and also includes publicizing activities for public welfare. Therefore, the "advertising" as used herein includes, for example, a publicizing activity performed for goods or services by a company, a publicizing activity for disseminating evacuation information in the event of a disaster, and other publicizing activities.

The on-board signage system 10 includes one or more vehicles 12, and a management center 14 capable of communicating with the vehicles 12. Each vehicle 12 has a display area 17 disposed at a position viewable from outside the vehicle 12 as shown in FIG. 2, and an image assigned to the vehicle 12 is displayed on the display area 17. The vehicle 12 is configured to function as movable digital signage by displaying the image on the display area 17.

The vehicle 12 is able to communicate with the management center 14. In this example, the vehicle 12 is connected through an Internet channel 110 to the management center 14. Alternatively, the vehicle 12 may be configured to communicate directly or via various infrastructure facilities (such as, for example, a traffic light unit) with the management center 14, without using the Internet channel 110. In addition, the vehicle 12 can directly communicate with a registered terminal 100 located within a predetermined range of the vehicle 12 without using the Internet channel 110.

The management center 14 is connected to a public communication network (i.e., the Internet channel 110). The Internet channel 110 is also connected with a plurality of registered terminals 100. The registered terminals 100 are previously registered in the on-board signage system 10. The on-board signage system 10 incorporates a terminal database 70 (see FIG. 6) for storing identification information and owner information of the registered terminals 100, in which the identification information and the owner information are associated with each other. The owner information includes attributes of the owner, such as age and gender of the owner, for example. Each of the registered terminals 100 includes a location sensor (such as, for example, a GPS sensor). Further, each of the registered terminals 100 includes a previously installed application for the signage system. Once the application is activated, the registered terminal 100 transmits, as its own location information, a detection result from the location sensor to the management center 14 at regular intervals. This allows the management center 14 to acquire locations of the plurality of registered terminals 100.

The management center 14 selects, based on information of the acquired locations of the registered terminals 100 and the owner information of the registered terminals 100 stored in a terminal database 70 (see FIG. 6), at least one of a travel route for the vehicle 12 and an image to be assigned to the vehicle 12, and transmits the selected travel route or the selected image to the vehicle 12.

Before explaining specific components of the on-board signage system 10, operation forms of the on-board signage system 10 are briefly described. The operation forms of the on-board signage system 10 in this example are broadly categorized into two forms. In a first operation form, an image to be displayed on the vehicle 12 is previously determined, and the management center 14 selects a travel route with a view toward increasing an advertising effect of the image. In such a case, the vehicle 12 is mainly intended for advertising and is not intended, in principle, for transporting people or goods. Further, in this case, the management center 14 estimates a region suitable for presentation of the image assigned to the vehicle 12, based on the location information and the owner information of the registered terminals 100, and selects the travel route of the vehicle 12 based on the estimated region.

Figure 3:
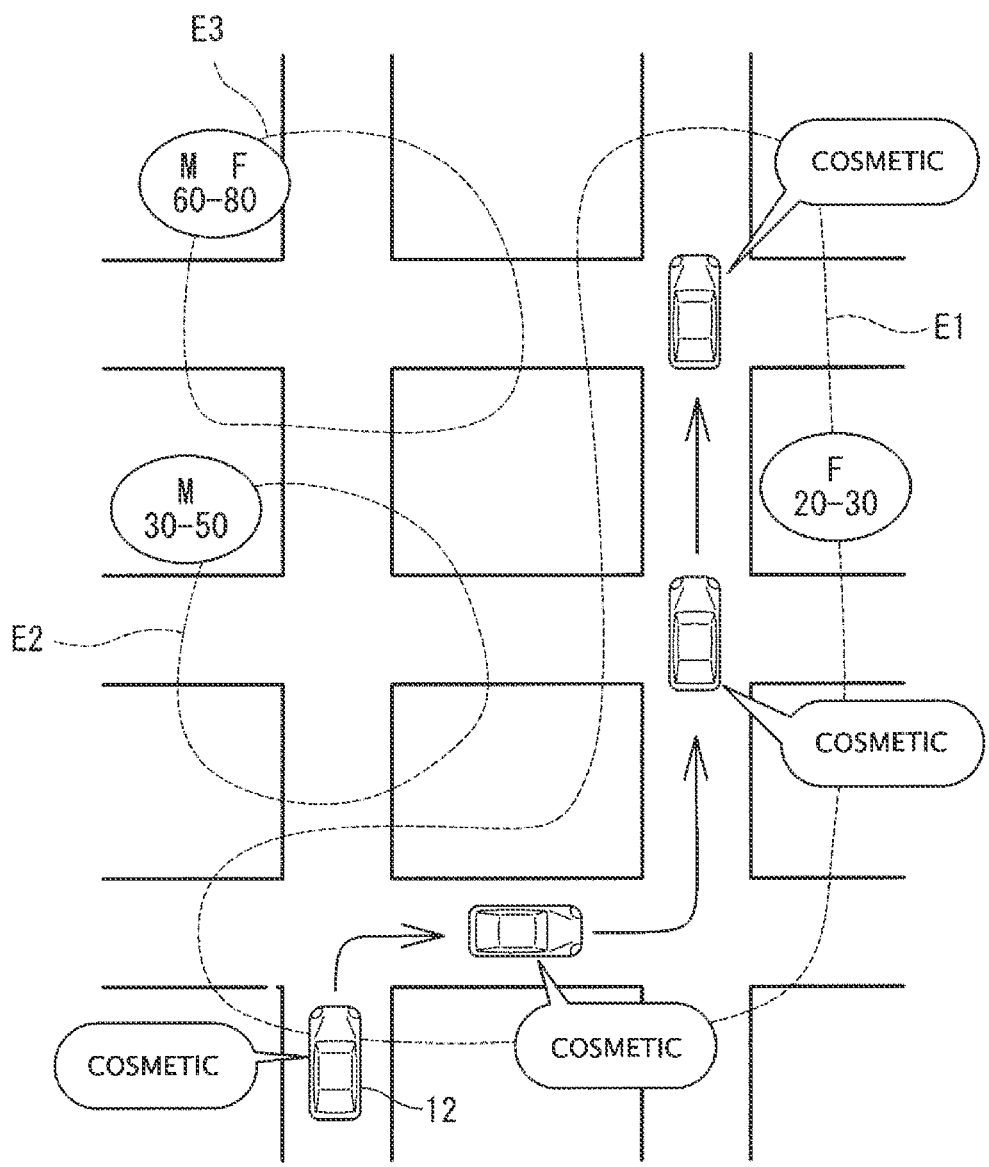
FIG. 3 is a diagram for explaining a first operation form.

FIG. 3 is a diagram for explaining the first operation form. The management center 14 acquires information on the locations of the plurality of registered terminals 100 and finds information on the owners of the registered terminals 100 that are recorded in the terminal database 70, which allows the management center 14 to identify which area includes people having what kind of attributes. Here, it is assumed that the management center 14 finds, as a result of analyzing the location information and the owner information of the registered terminals 100 that a first area E1 includes many women in their twenties and thirties, a second area E2 includes many men in their thirties to fifties, and a third area E3 includes a lot of men and women in their sixties to eighties as shown in FIG. 3. It is further assumed that the vehicle 12 is previously assigned with an image targeted for women, such as, for example, an advertising image of a cosmetic.

In the thus-assumed situation, the management center 14 determines the travel route of the vehicle 12 in such a manner that the vehicle 12 travels along a route that matches the assigned image; specifically, a route which passes through an area where there are a lot of women. In the example of FIG. 3, because the first area E1 includes many women, the management center 14 selects a route along which the vehicle 12 travels through the first area E1 for a longer length of time, and transmits the selected route to the vehicle 12. Then, the vehicle 12 travels along the transmitted route.

In a second operation form, the management center 14 is not involved in determination of the travel route of the vehicle 12, and instead determines the image which is assigned to the vehicle 12. In this case, the travel route of the vehicle 12 is exclusively determined in the vehicle 12, and the vehicle 12 is mainly intended for transporting people or goods. In this situation, the management center 14 receives from the vehicle 12 a vehicle location which may be a present location or a future location of the vehicle 12, and estimates a trend of people in a vicinity of the vehicle location based on the location information and the owner information of the registered terminals 100. Then, the management center 14 selects, based on the estimated trend, an image which matches the vehicle location and transmits the selected image to the vehicle 12.

Figure 4:
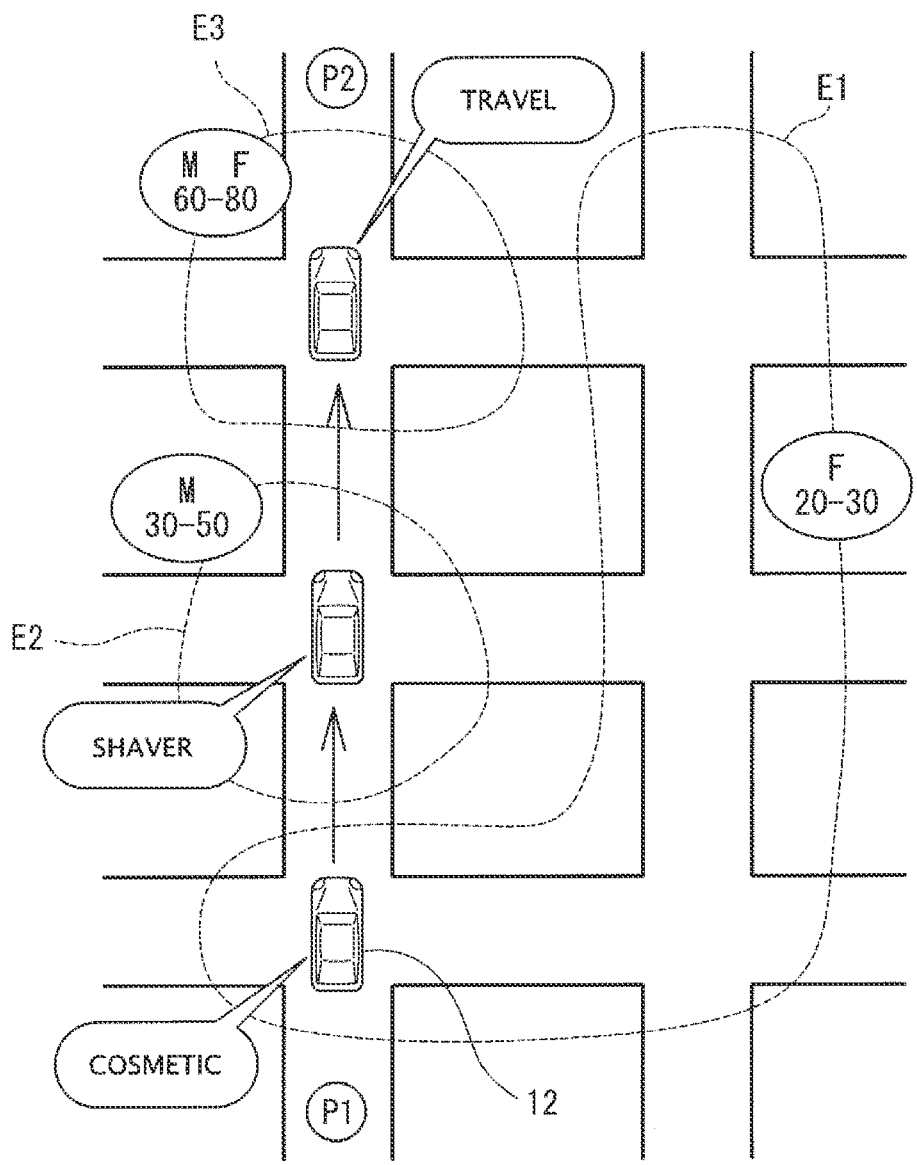
FIG. 4 is a diagram for explaining a second operation form.

FIG. 4 is a diagram for explaining the second operation form. In FIG. 4, the distribution of people is identical to that in FIG. 3. On the other hand, it is assumed that the vehicle 12 sequentially passes through the first area E1, the second area E2, and the third area E3 in order to move from a departure place P1 to a destination P2. In this situation, the management center 14 assigns to the vehicle 12 an image targeted for women, such as, for example, the advertising image of a cosmetic when the vehicle 12 is traveling through the first area E1 where there are many women in their twenties and thirties. Further, when the vehicle 12 enters, after passing through the first area E1, the second area E2 where there are many men in their thirties to fifties, the management center 14 assigns to the vehicle 12 an image targeted for men, such as, for example, an advertising image for a shaver. Still further, when the vehicle 12 enters the third area E3 where there are a lot of men and women in their sixties to eighties, the management center 14 assigns to the vehicle 12 an image targeted for elderly people, such as, for example, an advertising image of a travel tour designed for elderly people. The assigned images are transmitted to the vehicle 12 as needed and displayed on the display area 17 of the vehicle 12.

Figure 5:
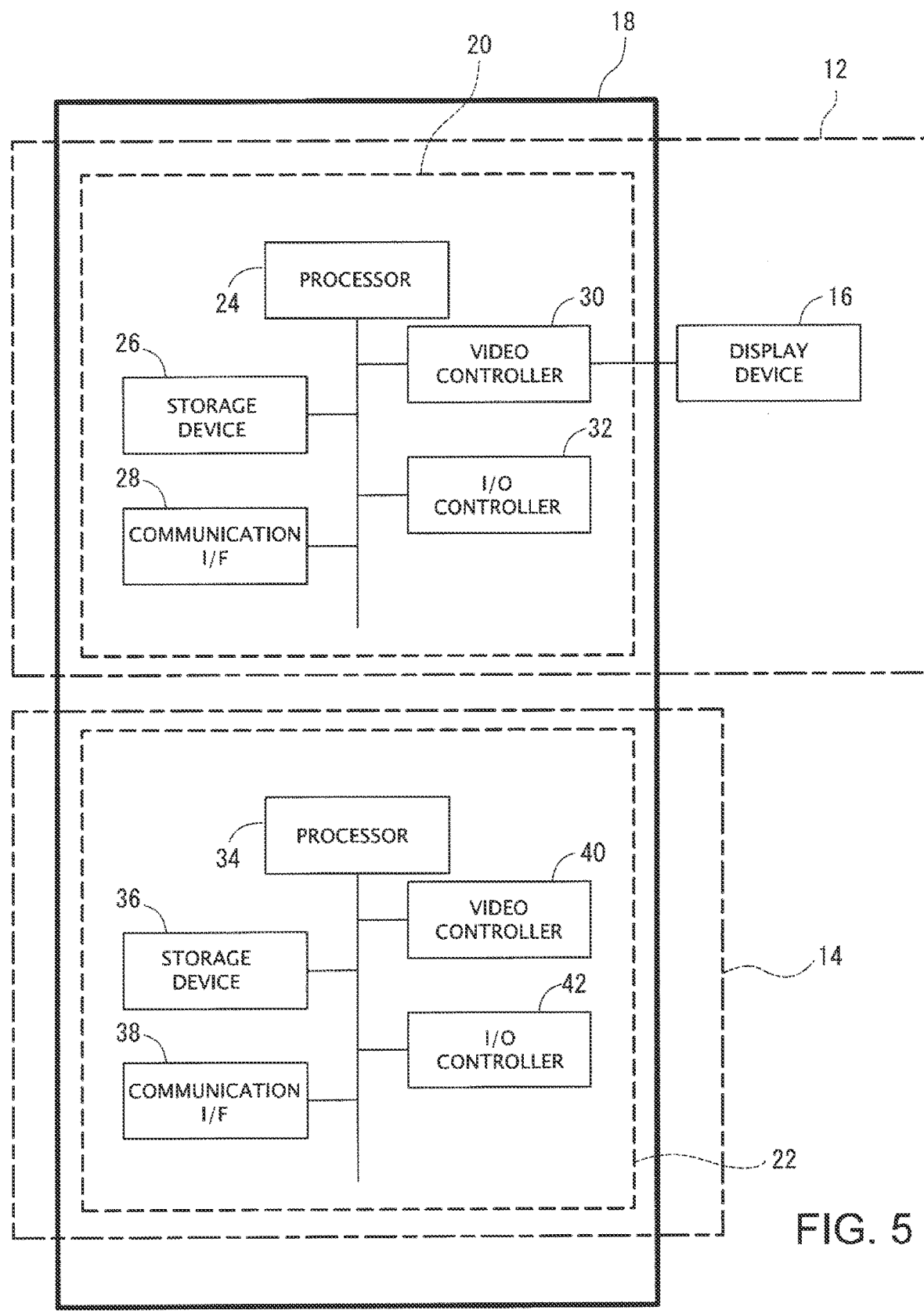
FIG. 5 is a block diagram showing a physical configuration of the on-board signage system.
Figure 6:
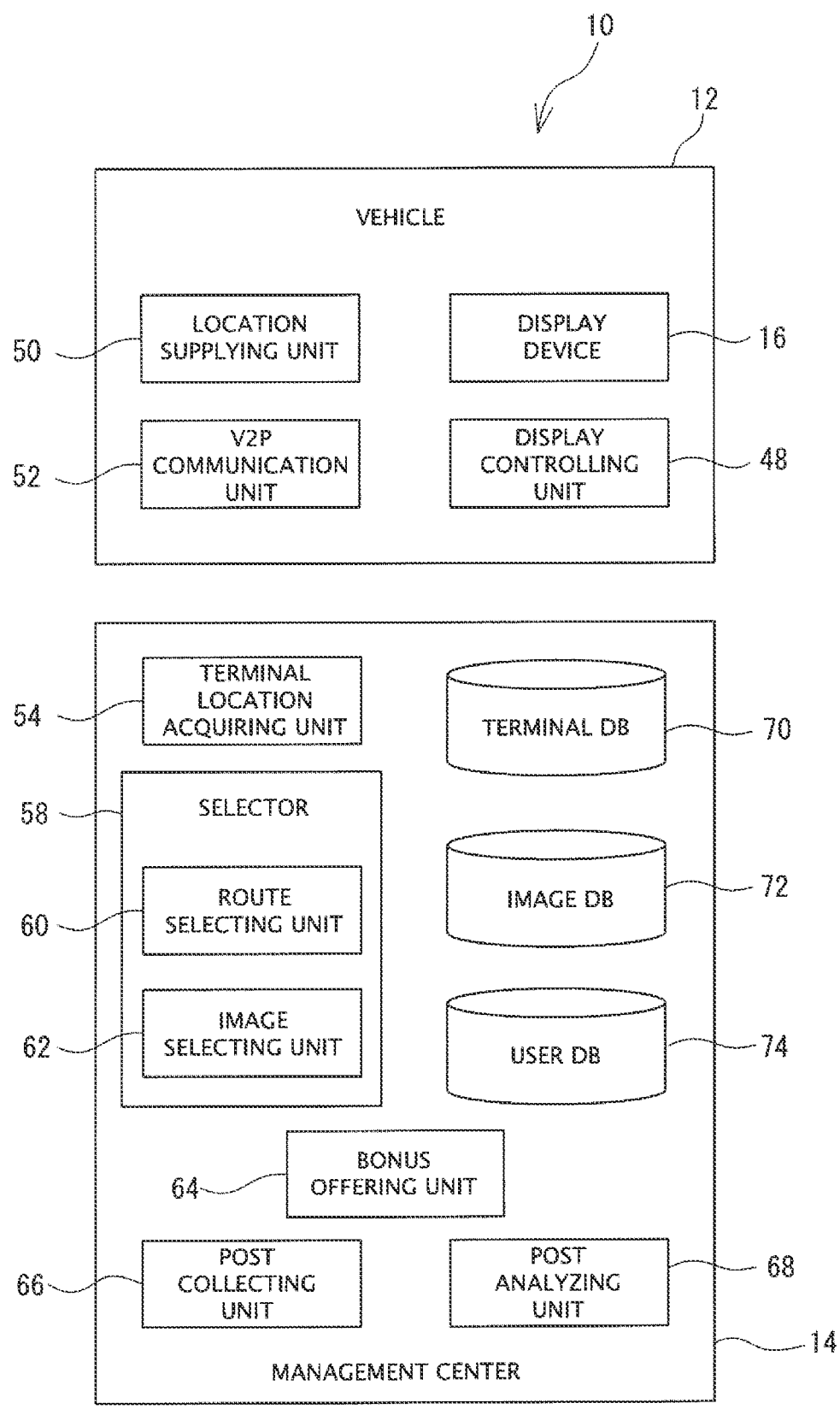
FIG. 6 is a block diagram showing a functional configuration of the on-board signage system.

Next, specific components of the on-board signage system 10 are explained with reference to FIGS. 5 and 6. FIG. 5 is a block diagram showing a physical configuration of the on-board signage system 10, and FIG. 6 is a block diagram showing a functional configuration of the on-board signage system 10.

In a physical aspect, the on-board signage system 10 includes one or more vehicles 12, a display device 16 installed in each of the vehicles 12, and a signage controller 18. The signage controller 18 is configured to control operation of each component in the on-board signage system 10. The signage controller 18 is composed, as will be explained in detail below, of a vehicle controller 20 installed in each of the vehicles 12 and a center controller 22 installed in the management center 14.

The type and shape of the vehicle 12 is not limited to any specific type and shape, so long as the vehicle 12 has the display area 17 at a position viewable from outside the vehicle 12. Therefore, the vehicle 12 may be a passenger vehicle as illustrated in FIG. 2, a truck which is mainly intended for transporting cargoes, or a bus which is mainly intended for transporting an unspecified large number of people. Further, the vehicle 12 may be a vehicle which is mainly used for a purpose of transporting people or goods, such as, for example, a private automobile, a freight truck, or a fixed-route bus, or may be a vehicle which is mainly used for a purpose of advertising; i.e. a so-called billboard truck. Still further, the vehicle 12 may be configured to be controlled in most of its operations including acceleration, deceleration, and steering by a driver of the vehicle 12, or may be a driver-assisted vehicle or an automated vehicle whose operations including acceleration, deceleration, and steering are partially or entirely controlled by the vehicle 12 itself. In either case, the vehicles 12 and the owners thereof are previously registered in the on-board signage system 10, and information of the vehicles 12 and the owners thereof is stored in a user database 74 of the management center 14.

Each of the vehicles 12 includes the display device 16 which is configured to display an image on the display area 17 viewable from outside the vehicle 12. As the display device 16, for example, a display disposed on an exterior surface of the vehicle 12 may be used. In such a case, the display functions as the display area 17. When the display device 16 is the display, the display device 16 may be attached to the exterior surface of the vehicle 12 or attached to an inner surface of a window glass of the vehicle 12. Alternatively, the display device 16 may be composed, as shown in FIG. 2, of a transparent display, and the transparent display may be arranged within a window of the vehicle 12 in place of the window glass of the vehicle 12. In a case where the display arranged within the window hampers a vehicle occupant from viewing outside scenery through the window, a camera for capturing images of the outside scenery may be mounted on the vehicle 12 along with a display which is configured to display the images captured by the camera.

Further alternatively, the display device 16 may be a projector which projects the image onto a portion (such as, for example, an engine hood or a trunk hood) of the vehicle 12 or onto a road surface. In such a case, an area onto which the image is projected by the projector serves as the display area 17.

It may be the case that only one display area 17 is disposed on the vehicle 12, or two or more display areas 17 may be disposed on the vehicle 12. For example, the display area 17 may be disposed on both a rear surface and a side surface of the vehicle 12 as illustrated in FIG. 2. In this case, the display area 17 on the rear surface and the display area 17 on the side surface may display the same image or may display images which differ from each other.

The signage controller 18 is composed of the vehicle controller 20 and the center controller 22. The vehicle controller 20 is a computer incorporating a processor 24, a storage device 26, a communication interface 28, a video controller 30, and an input/output controller 32. The term "computer" as used herein encompasses a microcontroller in which a computer system is incorporated into a single integrated circuit. It should be noted that the processor 24 denotes a processor in a broad sense and includes a general-purpose processor (such as, for example, a Central Processing Unit, CPU), and a special-purpose processor (such as, for example, a Graphics Processing Unit, GPU; an Application Specific Integrated Circuit, ASIC; a Field Programmable Gate Array, FPGA; and a programmable logic device).

The storage device 26 may include at least one of a semiconductor memory (such as, for example, a RAM, a ROM, and a solid state drive) and a magnetic disc (such as, for example, a hard disc drive).

The communication interface 28 allows the vehicle 12 to communicate with various devices located outside the vehicle 12. The communication interface 28 may support a plurality of types of communication protocols. Therefore, the communication interface 28 may include a communication facility capable of Internet communication through a wireless LAN, such as, for example, Wi-Fi (Registered Trademark), or through mobile data communication services provided by mobile phone companies, or the like. In addition, the communication interface 28 may include a communication facility (such as an antenna) for Dedicated Short Range Communication (DSRC) to communicate with other vehicles and infrastructure facilities on roads without using the Internet. Moreover, the communication interface 28 may be adapted to a communication protocol for establishing, through short range or middle range wireless communication, a direct communication with the registered terminals 100 located in the vicinity of the vehicle 12; i.e., so-called vehicle-to-pedestrian (V2P) communication. The communication protocol for the V2P communication is Bluetooth (Registered Trademark), for example. The vehicle controller 20 transmits and receives a variety of data items to and from the management center 14 and the registered terminals 100.

The video controller 30 controls display operation of the display device 16 under the control of the processor 24. The input/output controller 32 controls operation to exchange data with devices mounted on the vehicle 12, such as, for example, a location sensor and a navigation device.

It should be noted that the vehicle controller 20 which is illustrated as a single computer in FIG. 5 may be composed of a plurality of computers which are physically separated. Therefore, the controller 20 may include a plurality of processors 24.

The center controller 22 is also composed of a computer which incorporates, similarly with the vehicle controller 20, a processor 34, a storage device 36, a communication interface 38, a video controller 40, and an input/output controller 42. As used herein, the term "computer" encompasses a microcontroller in which a computer system is incorporated into a single integrated circuit. Further, the processor 34 is a processor in a broad sense, and thus includes a general-purpose processor and a special-purpose processor.

The storage device 36 may include at least one of a semiconductor memory (such as, for example, a RAM, a ROM, and a solid state drive) and a magnetic disc (such as, for example, a hard disc drive). Further, the storage device 36 is not necessarily located, in its entirety, at the same physical location as the processor 34 or other components, and may include a storage device located in a cloud. The communication interface 38 is a component which enables communication with various external devices located outside of the management center 14, and may include, for example, a communication facility for establishing Internet communication. Further, the center controller 22 is not necessarily composed of a single computer, and may be composed of a plurality of computers capable of establishing wired or wireless communication.

In a functional aspect, the vehicle 12 includes, as shown in FIG. 6, the display device 16, a display controlling unit 48, a location supplying unit 50, and a V2P communication unit 52. The display device 16 is, as described above, configured to display the image on the display area 17. The display controlling unit 48 is configured to operate the display device 16 to display the assigned image transmitted from the management center 14.

The location supplying unit 50 transmits to the management center 14 the location information indicative of a present or future vehicle location of the vehicle 12 in response to a request from the management center 14. The vehicle location transmitted to the management center 14 may be, for example, a detection result from the location sensor (such as, for example, a GPS sensor) mounted on the vehicle 12. Alternatively, while a navigation device mounted on the vehicle 12 is performing route guidance, a travel route specified by the navigation device may be transmitted as the vehicle location to the management center 14.

Next, a configuration of the management center 14 is described. A terminal location acquiring unit 54 in the management center 14 acquires location information of the plurality of registered terminals 100 recorded in the terminal database 70. Specifically, the registered terminal 100 in which an application program for the signage system is previously installed as described above transmits, at regular intervals, the location of the registered terminal 100 together with the identification information of the registered terminal 100 to the management center 14 during a time period in which the application is activated. The terminal location acquiring unit 54 records the location information received from the management center 14 in the terminal database 70.

The terminal database 70 records the identification information of each of the registered terminals 100, in which the identification information is associated with the owner information and the location information of the corresponding registered terminal 100. The owner information is information about the owner of the registered terminal 100, and includes, at least, attribute information of the owner. The attribute information includes at least one of gender, age, the place of residence, and the date of birth of the owner, and may additionally include the professional occupation, family members of the owner, and the like. The owner information may further include, in addition to the attribute information of the owner, the owner's action histories (such as, for example, a commodity purchase history of purchasing commodities using a credit card, an Internet search history) and personal preferences (such as, for example, a hobby) of the owner. The owner information may be input by the owner him/herself at the time of registering a new terminal as the registered terminal 100 or changing registered values of the registered terminal 100. Alternatively, the owner information may be automatically collected from data in an operation history of the registered terminal 100 under authorization from the owner.

FIG. 7 shows an example of data items recorded in the terminal database 70. In the example of FIG. 7, terminal IDs of the registered terminals 100 are stored in the form of a table in which each of the terminal IDs is associated with both the location of the corresponding registered terminal 100 and the owner information thereof. The location of each of the registered terminals 100 is updated in the terminal database 70 at regular intervals by the terminal location acquiring unit 54.

An image database 72 stores a plurality of candidate images and selection conditions of the candidate images, in which each of the candidate images is associated with the corresponding selection condition. The candidate image is a candidate of the image to be assigned to the vehicle 12; i.e., the image to be displayed on the display area 17 of the vehicle 12. The candidate image may be a static image or a moving image. The candidate image may be an advertising image presented for a commercial purpose, or an emergency image used for conveying necessary information in the event of a disaster. The candidate images may be supplied from a requester who requests advertisement by the on-board signage system 10, or may be generated in the management center 14.

Each candidate image is linked to its selection condition. The selection condition is a condition based on which the corresponding candidate image is selected as the image that is assigned to the vehicle 12. The selection condition includes, for example, a target condition defining a condition of a person to whom the candidate image is intended to be presented; i.e., a condition of a target person. Specifically, the target condition includes attributes (such as, for example, age, gender, family members, and professional occupation) of the target person. For example, a condition of "gender: male" may be specified as a target condition of an advertising image for advertising a shaver.

In addition, the selection condition may further include a temporal condition, a regional condition, a display period, a priority level, etc. of the corresponding candidate image. The temporal condition defines a time zone in which the candidate image is displayed, and a time period of "nighttime", for example, is specified as the temporal condition to a candidate image that is intended to be displayed only at night. Meanwhile, the regional condition is a regional designation of a place where the candidate image is intended to be displayed, and a condition of "* town", for example, is specified as the regional condition of a candidate image that is intended to be displayed only within a specific city of "* town". The display period defines a time period in which the candidate image is displayed, and a condition of several weeks before and after an opening date of a new store, for example, is specified as the display period to an image of advertising opening of the new store.

The priority level defines prioritization of the corresponding candidate image. The candidate image that is assigned a higher priority level is selected. The priority level is determined, for example, by the fee paid for displaying the candidate image, the degree of urgency associated with the candidate image, or the degree of public benefit contributed by the candidate image. For example, the candidate image that is charged at a higher rate may be assigned a higher priority level. Meanwhile, in the event of a disaster, an emergency image may be prioritized. In addition, each candidate image may be further linked to a track record of actual display of the candidate image, such as, for example, an accumulated length of displayed time of the candidate image. FIG. 8 shows an example of data items recorded in the image database 72. In the example of FIG. 8, candidate image IDs are stored in the form of a table in which they are associated with various selection conditions.

A selector 58 includes a route selecting unit 60 and an image selecting unit 62. The route selecting unit 60 is a component that is utilized in the first operation form, and is configured to select a travel route that matches the image assigned to the vehicle 12. To select the travel route, the route selecting unit 60 checks the ID of the image assigned to the vehicle 12 against the image database 72 to acquire the selection condition of the assigned image. Then, the route selecting unit 60 estimates, based on the location information and the owner information of the registered terminals 100 recorded in the terminal database 70, a region including a lot of people who satisfy the selection condition, and selects the travel route that passes through the estimated region. A method for estimating the region is not specifically limited to any particular method. As one example of the method, the estimation may be implemented in such a manner that points are scored for each of the registered terminals 100 stored in the terminal database 70 based on a degree of relevance to the target condition of the image assigned to the vehicle 12, and a region having a greatest sum total of scored points may be estimated as the region including a lot of people who satisfy the selection condition.

The image selecting unit 62 is a component utilized in the second operation form, and is configured to select an image to be assigned to the vehicle 12 from the candidate images recorded in the image database 72 and transmit the selected image to the vehicle 12. To select the image, the image selecting unit 62 requests the vehicle 12 to supply a present or future vehicle location of the vehicle 12 itself. In response to the request, the vehicle 12 transmits its vehicle location to the management center 14. The image selecting unit 62 checks the supplied vehicle location against the terminal database 70 to extract registered terminals 100 that are located in the vicinity of the supplied vehicle location. Then, the image selecting unit 62 estimates, based on the owner information of the extracted registered terminals 100, a trend of people located in the vicinity of the vehicle location, and selects the image to be assigned to the vehicle 12 based on the estimated trend.

The management center 14 further includes a bonus offering unit 64. The bonus offering unit 64 offers a bonus to at least either one of the owner of the vehicle 12 and the owner of the registered terminal 100 when predetermined feedback about the image displayed on the vehicle 12 is received from the owner of the registered terminal 100. The bonus is not limited to a specific item so long as the item is something beneficial to the owner of the vehicle 12 or the owner of the registered terminal 100. Therefore, the bonus may be, for example, an amount of money, points which can be used for shopping or for an application for a present, or a membership rank in a specific club (such as, for example, a fan club).

A form of feedback from the owner is not specifically limited so long as the form indicates a fact that the image is viewed by the owner of the registered terminal 100. In this example, the feedback from the owner is implemented in three forms. A first feedback form is V2P communication established between the vehicle 12 and the registered terminal 100. A second feedback form is an action of displaying detailed information about advertisement performed by the registered terminal 100. The vehicle 12 supplies the registered terminal 100 with access information necessary for the registered terminal 100 to display the detailed information. A third feedback form is an action of posting a content item relating to the vehicle 12 or relating to the image displayed on the vehicle 12 to an SNS site, the action being performed by the owner of the registered terminal 100. Such specific forms of feedback and detailed operation of the on-board signage system 10 performed in connection with feedback will be described below.

The user database 74 stores information on the owners of the registered terminals 100 and of the vehicles 12. Specifically, the user database 74 stores the attributes and contact details of the owners along with bonus values which are presently given to the owners. For the owners of the vehicles 12, the user database 74 further stores identification information of the corresponding vehicles 12. The owners of the registered terminals 100 are associated with their SNS accounts. The bonus offering unit 64 refers to the user database 74 in order to identify a target owner to whom the bonus is given, and updates the recorded bonus values and other recorded values as needed.

A post collecting unit 66 and a post analyzing unit 68 are configured to collect and analyze post content items uploaded to the SNS site on the Internet, for a purpose of offering a bonus. Specifically, the post collecting unit 66 accesses through the Internet channel 110 an SNS server to download the post content items which are uploaded by various users. The function of the post collecting unit 66 may be implemented, for example, by executing a program that is referred to as a crawler, a bot, a spider, a robot, or the like.

The post analyzing unit 68 analyzes the collected post content items to identify a post content item relating to the vehicle 12 or the image displayed on the vehicle 12. For a method for analyzing the post content items, well-known techniques including a text mining technique, a voice analyzing technique, and an image analyzing technique may be utilized. Alternatively, for analyzing the post content items, an artificial intelligence (AI) using machine learning, such as a neural network, may be utilized. In either case, the post analyzing unit 68 finds a post content item relating to the vehicle 12 or the image displayed on the vehicle 12, and transmits the found post content item to the bonus offering unit 64 as a responded post content item. The bonus offering unit 64 checks the responded post content item against the user database 74, and offers as needed a bonus to at least one of the owner of the registered terminal 100 and the owner of the vehicle 12.

Figure 9:
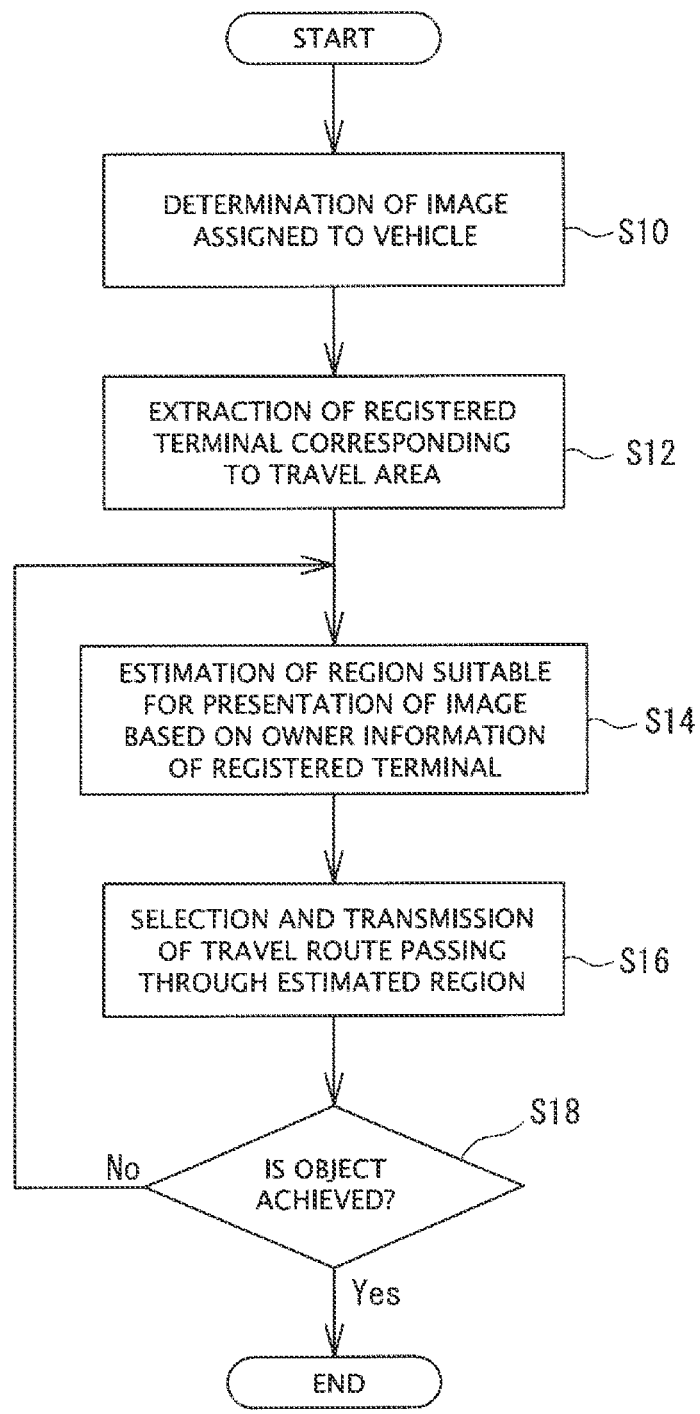
FIG. 9 is a flowchart showing a flow of process steps performed in the first operation form by the on-board signage system.

Next, a flow of process steps in the on-board signage system 10 is described. FIG. 9 is a flowchart showing a flow of process steps performed in the first operation form by the on-board signage system 10. In the first operation form, the image assigned to the vehicle 12 is initially determined as described above (step S10). The determination of the image may be performed by a person, or may be automatically performed by the management center 14 based on the priority level recorded in the image database 72.

After the image to be assigned to the vehicle 12 is determined, the management center 14 extracts registered terminals 100 that are located in a travelable area (step S12). Here, any destinations or other places to go of the vehicle 12 are undecided in the first operation form, although the travelable area of the vehicle 12 is limited to a certain extent. For this reason, the management center 14 extracts from the terminal database 70 the registered terminals 100 located in the travelable area of the vehicle 12.

Following the extraction, the management center 14 estimates, based on the owner information of the extracted registered terminals 100, a region suitable for presentation of the assigned image (step S14). Specifically, the management center 14 identifies the registered terminals 100 having the owner information that satisfies the selection condition of the assigned image, and acquires a location distribution of the identified registered terminals 100. Then, the management center 14 estimates, based on the acquired location distribution, a region where there are a lot of people who satisfy the selection condition of the image as the region suitable for presentation of the image.

After the region suitable for presentation is estimated, the management center 14 selects a travel route that passes through the estimated region and transmits the selected travel route to the vehicle 12 (step S16). In this way, the vehicle 12 travels along the transmitted travel route, to thereby present the image in the estimated region.

When a predetermined objective is achieved as a result of performing the above-described process steps (Yes is selected in step S18), operation is terminated. Here, the objective may be defined in terms of a length of time or in terms of a distance. For example, when an accumulated length of displayed time of the image, or a distance traveled by the vehicle 12 under a condition of displaying the image reaches a target value, it may be determined that the objective is achieved. Alternatively, when a predetermined amount of feedback is obtained from the owners of the registered terminals 100, the objective may be determined to have been achieved. On the other hand, when the objective is not achieved (No is selected in S18), operation returns to step S14, and estimation of a region and subsequent selection and transmission of a travel route are performed again.

In this example, the region suitable for presentation of the image is estimated based on both the location information and the owner information of the registered terminals 100, and the travel route of the vehicle 12 is selected so as to pass through the estimated region as described above. In this example, it is naturally considered that the vehicle 12 actively goes to the region where there are a lot of people targeted for advertisement of the image in order to advertise the image. In this way, the effect of advertising the image can be enhanced.

Figure 10:
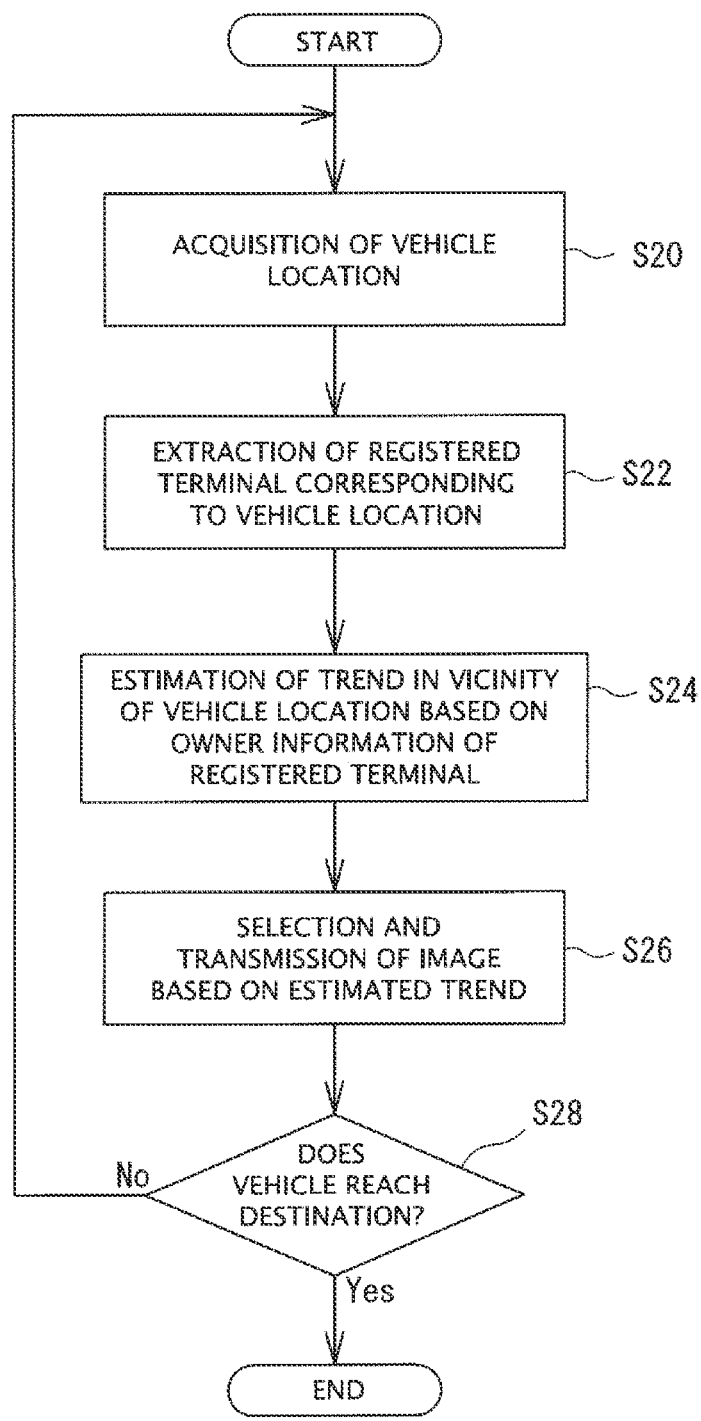
FIG. 10 is a flowchart showing a flow of process steps performed in the second operation form by the on-board signage system.

Next described is a flow of process steps performed in the second operation form by the on-board signage system 10. FIG. 10 is a flowchart showing the flow of the process steps performed in the second operation form by the on-board signage system 10. In the second operation form, the management center 14 cannot be involved in determination of the travel route of the vehicle 12, as described above. Therefore, the management center 14 initially acquires the present or future vehicle location of the vehicle 12 (step S20). Specifically, the management center 14 sends to the vehicle 12 a request to transmit the vehicle location. Upon receipt of the request, the vehicle 12 transmits its present or future vehicle location to the management center 14. Here, the vehicle location to be transmitted may be a present location of the vehicle 12 that is detected by the location sensor. Alternatively, in a case where a navigation system is performing route guidance, the vehicle location to be transmitted may be a travel route that is supplied to the vehicle 12 by the navigation system.

After the vehicle location is acquired, the management center 14 extracts, from the terminal database 70, information about registered terminals 100 located in the vicinity of the vehicle location (step S22). Then, the management center 14 estimates, based on the location information and owner information of the estimated registered terminals 100, a trend of people located in the vicinity of the vehicle location (step S24). Following this, the management center 14 selects, based on the estimated trend, an image to be assigned to the vehicle 12, and transmits the selected image to the vehicle 12 (step S26).

After the image is transmitted to the vehicle 12, operation is finished when the vehicle 12 reaches the destination (Yes is selected in step S28). On the other hand, when the vehicle 12 keeps traveling without reaching the destination (No is selected in step S28), the management center 14 returns to step S20, and repeats the above-described process steps in a similar manner.

In this example, the trend of the people located in the vicinity of the vehicle location is estimated based on the location information and the owner information of the registered terminals 100, and the image to be assigned to the vehicle 12 is selected based on the estimated trend as described above. When configured as described above, it becomes possible to display suitable images, which can ensure that the advertising effect of the image is enhanced.

Figure 11:
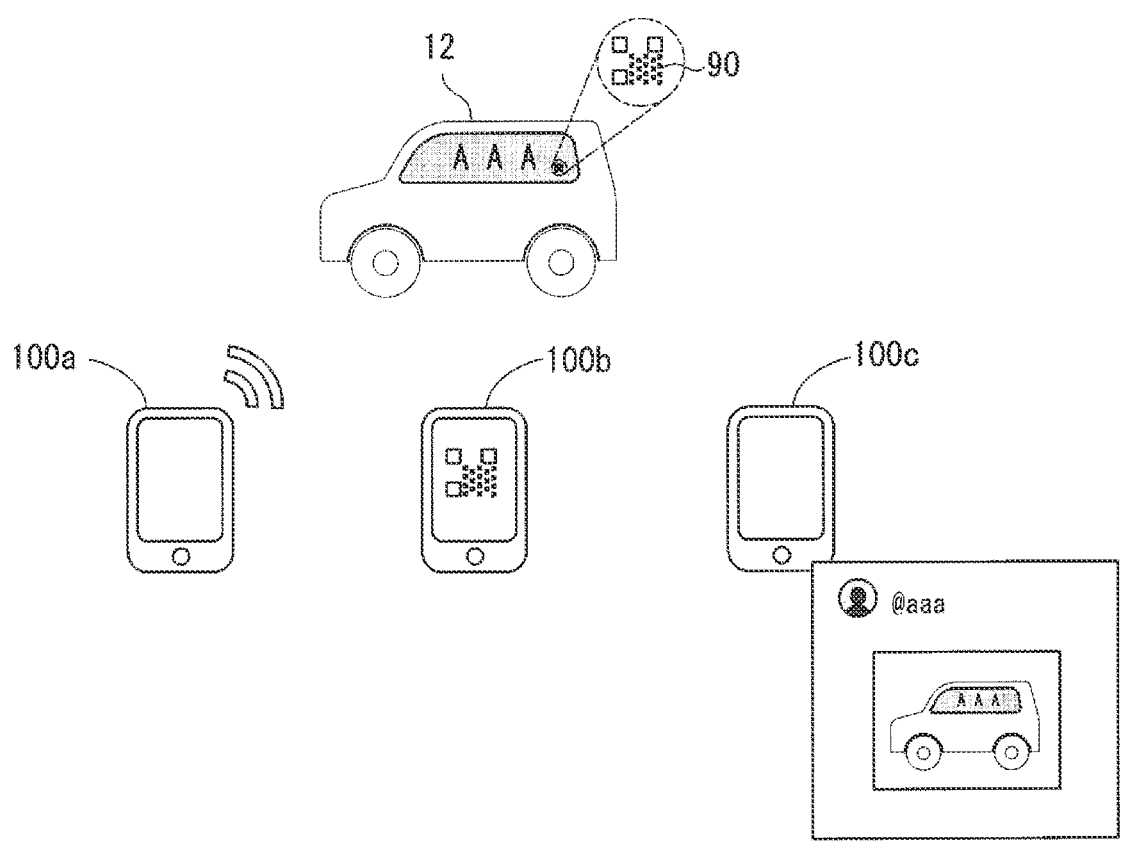
FIG. 11 is a diagram showing forms of feedback from a registered terminal.

Next, forms of feedback from the owner of the registered terminal 100 and detailed actions of feedback will be described with reference to FIG. 11. FIG. 11 is a diagram showing the forms of feedback from the owner of the registered terminal 100.

In this example, as in the case of a registered terminal 100a in FIG. 11, an action of establishing V2P communication with the vehicle 12 displaying an image is treated as a form of feedback from the owner of the registered terminal 100. The V2P communication is direct communication between the vehicle 12 and the registered terminal 100a without using the Internet channel. The V2P communication can be established by a communication protocol for short-range or middle-rage wireless communication, such as Bluetooth (Registered Trademark), for example. In this example, the vehicle 12 broadcasts a push message toward the registered terminals 100 located close to the vehicle 12, such as the registered terminal 100a, using a Bluetooth transmitter, which is generally referred to as a Bluetooth beacon. Upon receipt of the message, the registered terminal 100a returns its identification information to the vehicle 12.

Here, only the registered terminal 100a that is located within a predetermined range of the vehicle 12 is able to receive the message through the V2P communication. Therefore, it can be safely estimated that the registered terminal 100a having succeeded in establishing the V2P communication is located close to the vehicle 12 with the owner of the registered terminal 100a looking at the image displayed on the vehicle 12. Accordingly, the vehicle 12, which has received the returned identification information from the registered terminal 100a, transmits the received identification information to the management center 14. The management center 14 identifies from the acquired identification information the owner of the registered terminal 100a, and offers a bonus to at least one of the owner of the registered terminal 100a and the owner of the vehicle 12.

In the above-described case where the established V2P communication is treated as feedback, an offer of the bonus to the owner of the registered terminal 100a can motivate the owner of the registered terminal 100a to approach the vehicle 12 in order to look at the image. On the other hand, an offer of the bonus to the owner of the vehicle 12 can motivate the owner of the vehicle 12 to drive the vehicle 12 in such a manner that V2P communication can be easily established (for example, in a manner of driving at lower speeds, driving at a position close to a sidewalk, or the like). As a result, the effect of advertising the image can be further increased. Further, in the case where the established V2P communication is treated as feedback, the owner of the registered terminal 100a is not required to perform any special operation, which can allow the owner of the registered terminal 100a to be relieved from bothersome or troublesome operation.

It should be noted that in the case of treating the established V2P communication as feedback, it is also possible that feedback is acquired from a person who is not the target person who is intended to view the displayed image. For example, when a registered terminal 100 owned by a man is located in the vicinity of the vehicle 12 which displays an advertising image of a cosmetic for women, V2P communication can be also established with the registered terminal 100 of the man. However, such feedback from the registered terminal 100 of the man is not the feedback expected by an advertiser of the image. With this in view, the bonus to be offered to the owners of the registered terminal 100 and the vehicle 12 may be changed depending on a degree of matching between the attribute of the owner who has returned feedback and the selection condition of the image displayed on the vehicle 12. For example, when the vehicle 12 which displays the advertising image of the cosmetic for women receives feedback from (in other words, establishes V2P communication with) registered terminals 100 owned by a man and owned by a woman, respectively, the woman may be given a more profitable bonus than the man.

Next, another form of feedback is described. As in the case of a registered terminal 100b in FIG. 11, an action of accessing detailed information of the image displayed on the vehicle 12 may be treated as feedback from the owner of the registered terminal 100. In such a case, the vehicle 12 is configured to supply the registered terminal 100b with predetermined access information necessary for displaying the detailed information. The access information may include a URL of a web page on the Internet that shows the detailed information, or a code image 90 of the URL (such as, for example, a QR Code (registered trademark)). The access information which is the URL of the web page may be transmitted through V2P communication from the vehicle 12 to the registered terminal 100b. On the other hand, the access information which is the code image 90 is embedded in the image displayed on the vehicle 12, and the registered terminal 100 can read the code image 90 with a camera to access the detailed information.

An access to the detailed information performed by the registered terminal 100b may be detected by the registered terminal 100b itself, for example, and information of the detected access may be transmitted to the vehicle 12 or the management center 14 by the registered terminal 100b. Alternatively, a web site server showing the detailed information may detect the access from the registered terminal 100*b*, and the information of the detected access may be transmitted to the management center 14 by the server. In either case, when the registered terminal 100*b* has accessed the detailed information, the management center 14 offers the bonus to at least one of the owner of the registered terminal 100*b* and the owner of the vehicle 12 which has supplied the access information.

When the access to the detailed information from the registered terminal 100*b* is treated as feedback, the offer of the bonus to the owner of the registered terminal 100*b* can motivate the owner of the registered terminal 100*b* to access the detailed information. On the other hand, the offer of the bonus to the owner of the vehicle 12 can motivate the owner of the vehicle 12 to drive the vehicle 12 in a manner of allowing access information to be easily supplied (for example, in a manner of driving at lower speeds, driving at a position close to a sidewalk, or the like). As a result, the effect of advertising the image can be further increased.

A further form of feedback is described below. As in the case of a registered terminal 100*c* in FIG. 11, an action of uploading a post content item relating to the vehicle 12 or relating to the image displayed on the vehicle 12 to the SNS site may be treated as feedback. To acquire feedback in this form, the management center 14 collects and analyzes, as described above, the post content items uploaded to the SNS site on the Internet, and identifies the post content item relating to the vehicle 12 or the image displayed on the vehicle 12 as the responded post content item. The responded post content item typically includes a captured image of the vehicle 12 or the image displayed on the vehicle 12 that is captured by the camera of the registered terminal 100*c*. The management center 14 checks an account of a contributor who has posted the responded post content item against the user database 74 to identify the contributor. Further, the management center 14 also identifies the vehicle 12 that is related to the responded post content item, based on the captured image contained in the responded post content item. To facilitate identifying the contributor or the vehicle 12, the identification information of the vehicle 12 may be included in the image displayed on the vehicle 12 or attached to a portion of the vehicle 12 located close to the display area 17.

In either case, uploading any post content item relating to the vehicle 12 or relating to the image displayed on the vehicle 12; i.e., uploading the responded post content item to the SNS site, is treated as feedback. In this case, an offer of the bonus to the contributor can help actively spread advertisement performed by the vehicle 12. Meanwhile, the offer of the bonus to the owner of the vehicle 12 can motivate the owner of the vehicle 12 to drive the vehicle 12 in such a manner that posting to the SNS site is facilitated (for example, in a manner of driving at lower speeds, driving at a position close to a sidewalk, or the like). As a result, the advertising effect of the image can be further increased.

The feedback forms explained above are only presented by way of illustration, and may be changed as appropriate. For example, three feedback forms have been explained above, while more than three or fewer than three feedback forms may be employed in the on-board signage system 10. In addition, a material offered as the bonus may be changed depending on the form of feedback. For example, the feedback in the form of uploading the post content item can allow an advertisement requester to intuitively recognize the effect of advertisement, and therefore may be considered to be more effective than the feedback in the form of established V2P communication. With this in view, a bonus which is offered in a case where the responded post content item is uploaded may be defined to be more beneficial than a bonus which is offered in a case where V2P communication is established.

Figure 12:
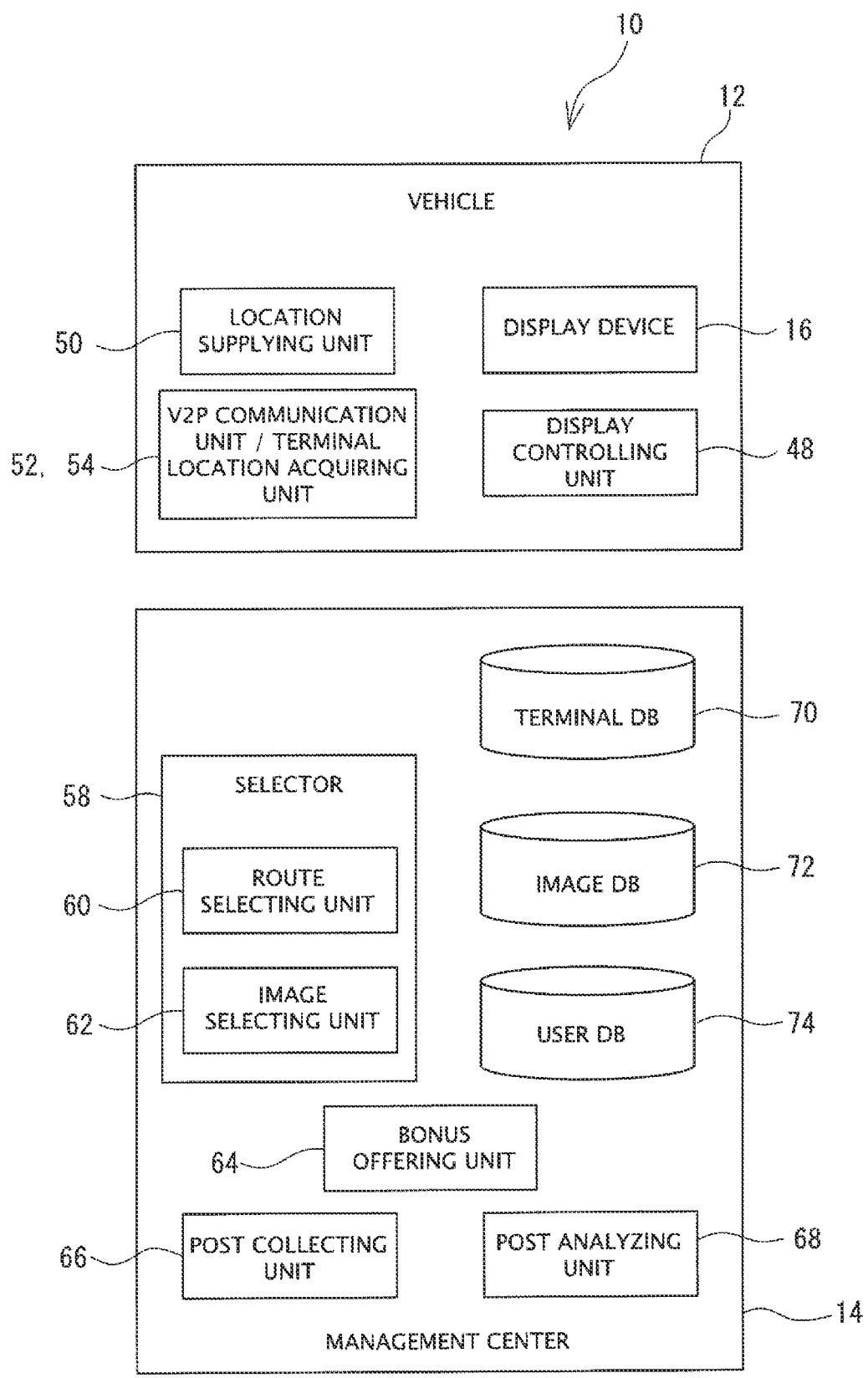
FIG. 12 is a block diagram showing a functional configuration of another on-board signage system.

Next, another example of the on-board signage system 10 is described. FIG. 12 is a block diagram showing a functional configuration of the on-board signage system 10 in this example. The physical configuration of the on-board signage system 10 in this example is substantially identical to that shown in FIG. 5, and explanation about the physical configuration is not repeated. The on-board signage system 10 in this example is fitted to the second operation form in which the management center 14 selects the image to be assigned to the vehicle 12 without being involved in determination of the travel route of the vehicle 12.

The on-board signage system 10 shown in FIG. 12 differs from the on-board signage system 10 of FIG. 6 in that the V2P communication unit 52 installed in the vehicle 12 also functions as the terminal location acquiring unit 54 in the on-board signage system 10 of FIG. 12. Because a registered terminal 100 that has directly communicated with the vehicle 12 through the V2P communication unit 52 is located within a predetermined range of the vehicle 12, it can be determined that the owner of the registered terminal 100 is highly likely to view the image displayed on the vehicle 12. Therefore, in this example, an image that matches the owner of the registered terminal 100 which has established the V2P communication is selected and displayed on the vehicle 12.

More specifically, the terminal location acquiring unit 54 installed in the vehicle 12 acquires, through the V2P communication, identification information of registered terminals 100 located close to the vehicle 12. Then, the terminal location acquiring unit 54 recognizes locations of the registered terminals 100 as a vicinity of the vehicle 12, and transmits the acquired identification information to the management center 14 together with the location of the vehicle 12. The management center 14 checks the received identification information of the registered terminals 100 against the terminal database 70, and selects an image fitted to the vehicle 12 based on the attributes of the owners of the registered terminals 100.

In the on-board signage system 10 of this example, because the management center 14 does not need to identify locations of a huge number of registered terminals 100, the amount of data processed by the management center 14 and the volume of communication traffic therein can be reduced. Further, in this example, the owners of the registered terminals 100 do not need to transmit information of their self-locations to the management center 14 at regular intervals, which can also lead to a reduced volume of communication traffic in the registered terminals 100. Here, the self-locations can be considered to be relatively important personal information. In the above-described configuration, there is no need to transmit to the management center 14 location information being the personal information from the registered terminals 100, which can ensure that the personal information is reliably protected.

It should be noted that the above-described on-board signage system 10 is presented merely as an example, and the configuration or components of the on-board signage system 10 may be changed as appropriate other than the feature that at least one of the travel route of the vehicle 12 and the image assigned to the vehicle 12 is selected at least based on the location information and the owner information of the registered terminal 100, and is transmitted to the vehicle 12. For example, while in the above example the signage controller 18 is composed of both the vehicle controller 20 installed in the vehicle 12 and the center controller 22 installed in the management center 14, the signage controller 18 may be composed of only one of the vehicle controller 20 and the center controller 22. Therefore, the management center 14 may be optional, and when the management center 14 is not provided, for example, the vehicle 12 may be configured to perform all of the process steps from acquiring the location information of the registered terminal 100 to selecting the image or the travel route.

Meanwhile, the form of information stored in the terminal database 70, the image database 72, or the user database 74 may be changed as appropriate. Further, the bonus offering unit 64, the post collecting unit 66, and the post analyzing unit 68 may be optional. Still further, the configuration of the vehicle 12 may be appropriately changed, and the vehicle 12 may further include a microphone to output sound/voice for advertising in addition to the display device 16 configured to display the image.

The invention claimed is:

1. An on-board signage system, comprising:
at least one vehicle;
a display device that is installed in the at least one vehicle, and configured to display an image which is assigned to the vehicle on one or more display areas viewable from outside the vehicle; and
a signage controller, wherein
the signage controller is configured to function as:
an image database that stores a plurality of candidate images assignable to the at least one vehicle;
a terminal database that stores identification information of a registered terminal that is previously registered in the on-board signage system and owner information of the registered terminal;
a terminal location acquiring unit that acquires location information of the registered terminal;
a selector that selects at least one of a travel route of the at least one vehicle and an image to be assigned to the at least one vehicle based on the location information of the registered terminal and the owner information of the registered terminal, and transmits the selected travel route or image to the at least one vehicle; and
a bonus offering unit that receives feedback about the image displayed on the vehicle from an owner of the registered terminal, from outside the vehicle, who is neither an owner of the vehicle nor a user of the vehicle, by vehicle-to-pedestrian communication, and determines, when the feedback about the image displayed on the vehicle is received, material to be offered as a bonus to the owner of the registered terminal who has provided the feedback about the image displayed on the vehicle, based on a form of the feedback received from the owner of the registered terminal and an attribute of the owner of the registered terminal.

2. The on-board signage system according to claim 1, wherein:
the selector comprises a route selecting unit that is configured to estimate, based on both the location information and the owner information of the registered terminal, a region where there are a lot of people who match the image assigned to the vehicle, and to select the travel route of the vehicle based on the estimated region.

3. The on-board signage system according to claim 2, wherein:
the selector comprises an image selecting unit that is configured to estimate, based on the owner information of the registered terminal located in a vicinity of a present or future vehicle location, a trend of people located in the vicinity of the vehicle location, and to select the image assigned to the vehicle based on the estimated trend.

4. The on-board signage system according to claim 3, wherein:
the vehicle comprises a vehicle-to-pedestrian communication unit that is configured to directly communicate with the registered terminal located within a predetermined range of the vehicle; and
the terminal location acquiring unit is configured to recognize, as the vicinity of the vehicle, a location of the registered terminal that has directly communicated with the vehicle through the vehicle-to-pedestrian communication unit.

5. The on-board signage system according to claim 1, wherein:
the vehicle comprises a vehicle-to-pedestrian communication unit that is configured to directly communicate with the registered terminal located within a predetermined range of the vehicle; and
the feedback comprises direct communication with the vehicle that is established by the registered terminal.

6. The on-board signage system according to claim 1, wherein:
the vehicle is configured to supply the registered terminal with access information which is used by the registered terminal for accessing detailed information of the image displayed on the vehicle; and
the feedback comprises an access to the detailed information performed by the registered terminal.

7. The on-board signage system according to claim 1, wherein
the feedback comprises entering a post content item relating to the vehicle or relating to the image displayed on the vehicle into a social networking service site.

8. The on-board signage system according to claim 1, wherein:
content of the feedback received from the owner of the registered terminal includes an attribute of the owner of the registered terminal; and
the bonus offering unit determines the material to be offered as the bonus to the owner of the registered terminal in accordance with a degree of matching between the attribute of the owner of the registered terminal who has returned feedback about the image displayed on the vehicle and a selection condition of the image displayed on the vehicle.

9. The on-board signage system according to claim 1, wherein:
the form of the feedback received from the owner of the registered terminal comprises a first feedback form in which communication is established between the vehicle displaying the image and the registered terminal and a second feedback form in which a post content item regarding the vehicle or the image displayed on the vehicle is uploaded to an SNS site; and
the bonus offering unit determines the material to be offered as a bonus to the owner of the registered terminal such that the bonus which is offered to the owner of the registered terminal in response to feedback in the second feedback form is more beneficial than the bonus which is offered to the owner of the registered terminal in response to feedback in the first feedback form.

\* \* \* \* \*